Patented Feb. 3, 1948

2,435,304

UNITED STATES PATENT OFFICE 2,435,304

METHOD FOR RECOVERING CHROMIUM VALUES FROM ORES

Charles V. Foerster, Canton, and Arthur T. Cape, Columbus, Ohio, assignors to Coast Reduction, Inc., Watsonville, Calif., a corporation of Delaware No Drawing. Application May 11, 1944, Serial No. 535,196

17 Claims. (Cl. 23—56)

This invention relates, as indicated to the beneficiation of ores, but has reference more particularly to the extraction of chromium from ores containing large amounts of iron but relatively small amounts of chromium.

In accordance with the invention, ores, preferably Mayari ores containing from about 2% to about 3% of chromium, approximately 50% of iron, and varying amounts of oxides such as alumina, silica, nickel oxide, manganese dioxide, cobalt oxide, lime and magnesia, are crushed to a desired particle size or fineness and intimately mixed with a chemical compound capable of yielding sodium oxide, such compound being used in amounts sufficient to form the following compositions:

Sodium ferrite, $Na_2O.Fe_2O_3$
Sodium silicate, $Na_2O.SiO_2$
Sodium aluminate, $Na_2O.Al_2O_3$
Sodium chromate, $Na_2O.CrO_3$
Sodium manganate, $Na_2O.MnO_3$ The sodium oxide may be derived from any commercial source, but as sodium bicarbonate is recovered in the final stage of the process, that compound will be used for the roasting operation, but as it is impossible to recover all of the sodium oxide, the difference will be made up in the form of sodium carbonate due to the cheapness and ready availability thereof. Another source, as for example, sodium hydroxide, and other compounds of sodium may also be used for this purpose.

The purpose of the foregoing is to form a mixture, which when heated under oxidizing conditions, causes the chromium in the ore, through reaction with the sodium salt, to be converted into a form wherein it may be easily and quickly extracted from the ore by leaching. This is accomplished when the compositions set forth in the aforesaid tabulation have been formed.

It was realized in the early stages of the experimental work in connection with this invention, that a large excess of $Na_2O$ over that required to form $Na_2O.CrO_3$ was absolutely necessary to extract successfully all of the chromium from the ore. In order to extract substantially the maximum available amount of chromium from such an ore a minimum of ¼ part by weight of $Na_2O$ to a maximum of ⅗ of one part of $Na_2O$ to one part of the ore should be used, the actual ratio used depending upon the chromium, but more especially on the other constituents found in the ore. The range of ratios referred to is used for ores of the Mayari type, containing roughly about 2.5% chromium.

The mixture of the ore and sodium compound is then subjected to an oxidizing roast at a temperature of from about 1300° F. to about 1900° F., a temperature of about 1800° F. being preferred in most cases.

If it is desired to extract only the chromium from the ore, without regard to the recovery of other values from the ore, the roasted ore is then subjected to leaching with hot water, this operation resulting in the extraction of the chromium in a form from which it may be removed by known chemical methods, which need not be described in this application.

If, however, it is desired to rid the ore of the excess soda as well as to remove with the chromium, the silica, manganese and alumina contained in the ore, the roasted ore is first subjected to leaching with cold water and then to leaching with hot water. This double leaching leaves a residue which contains most if not all of the iron. The iron oxide can, if necessary, be nodulized and used as a blast furnace charge for which the relatively high purity of the ore after treatment is particularly desirable.

If it is found desirable to reduce the sodium oxide left in the ore to even lower concentrations, this may be accomplished by washing with water containing carbon dioxide.

If the chromium is the main consideration and the removal of the silica and alumina relatively unimportant, then washing with hot water followed by a carbonic acid leach (i. e., water containing $CO_2$) will effectively remove all of the chromium and lower the concentration of residual soda to a very low value.

The alumina and silica can be precipitated by passing $CO_2$ through the liquor, and when they are removed, the $Na_2O$ can be recovered as sodium bicarbonate by passing additional quantities of $CO_2$ and lowering the temperature to below 15° C. The bicarbonate can then be used for the roasting operation with a fresh batch of ore.

The temperature of roasting should not be high enough to cause fusion of the mass, since such fusion renders it difficult to remove the last traces of soda.

A complete cycle of operations would thus involve roasting of the ore and sodium bicarbonate mixture, leaching, removal of the alumina and silica by means of carbon dioxide, precipitation of the chromium in a convenient manner, as by the addition of soluble lead or barium salts to precipitate the chromium as lead chromate or barium chromate, and recovery of the sodium bicarbonate by the use of carbon dioxide, the bicarbonate being then returned to the first stage of the process.

While the method has been described primarily in connection with sodium compounds, we have also found that potassium compounds corresponding to the aforesaid sodium compounds may be employed with substantially as good results. In such case, the roasting results in the formation of corresponding potassium compounds, but the amounts required will be greater, due to the difference between the molecular weights of sodium and potassium compounds. In the case of potassium carbonate, approximately 1.3 times as much thereof will be required as sodium carbonate.

The terms used in describing and claiming this invention have been used in their descriptive sense and not as terms of limitation and it is intended that all equivalents of the terms used be included within the scope of the appended claims.

We claim:

1. The method of recovering metal values from ores of the Mayari type, which comprises roasting a mixture of the ore and an alkali metal compound of the group consisting of the hydroxide, carbonate and bicarbonate of sodium and potassium, leaching the mixture with cold water so as to remove silica, manganese and alumina values therefrom, and then leaching the residue with hot water so as to remove chromium values.

2. The method, as defined in claim 1, in which the residue is then leached with water containing carbon dioxide to recover uncombined alkali metal compound.

3. The method, as defined in claim 2, in which the alkali metal compound is then recycled in the process.

4. The method of recovering metal values from ores of the Mayari type, which comprises roasting a mixture of the ore and sodium bicarbonate, leaching the mixture with cold water so as to remove silica, manganese and alumina values therefrom, and then leaching the residue with hot water so as to remove chromium values.

5. The method, as defined in claim 4, in which the residue is then leached with carbon dioxide to recover uncombined sodium compound.

6. The method, as defined in claim 5, in which the sodium bicarbonate is then recycled in the process.

7. The method of recovering metal values from ores of the Mayari type, which comprises roasting a mixture of the ore and an alkali metal compound of the group consisting of the hydroxide, carbonate and bicarbonate of sodium and potassium; leaching the resulting product with cold water so as to remove chromium, silica, manganese and alumina values therefrom, and then leaching the residue with hot water to remove the major portion of the remaining alkali metal therefrom.

8. The method, as defined in claim 7, in which the hot water leach reduces the alkali metal content of the ore to less than 1%.

9. The method, as defined in claim 7, in which the hot water leach reduces the alkali metal content of the ore to less than 1%, the ore being then further washed with water containing carbon dioxide, whereby the alkali metal content thereof is further reduced.

10. The method, as defined in claim 7, in which the hot water leach reduces the alkali metal content of the ore to less than 1%, the ore being then further washed with water containing carbon dioxide, whereby the alkali metal content thereof is further reduced, the alkali metal being then re-used in the roasting of fresh quantities of ore.

11. The method of recovering metal values from ores of the Mayari type, which comprises roasting a mixture of the ore and an alkali metal compound of the group consisting of the hydroxide, carbonate and bicarbonate of sodium and potassium, leaching the resulting product with hot water so as to remove chromium, manganese and alumina values therefrom, and then washing the residue with water containing carbon dioxide, whereby the alkali metal content of the ore is reduced to very small concentrations.

12. The method of recovering metal values from ores of the Mayari type, which comprises roasting a mixture of the ore and sodium carbonate, leaching the resulting product with cold water so as to remove chromium, silica, manganese and alumina values therefrom, and then leaching the residue with hot water to remove the major portion of the remaining soda therefrom.

13. The method, as defined in claim 12, in which the hot water leach reduces the soda content of the ore to less than 1%.

14. The method, as defined in claim 12, in which the hot water leach reduces the soda content of the ore to less than 1%, the ore being then further washed with water containing carbon dioxide, whereby the soda content of the ore is further reduced.

15. The method of recovering metal values from ores of the Mayari type, which comprises roasting a mixture of the ore and sodium carbonate, the mixture being in the proportion of from one-quarter part to three-fifths of a part of sodium oxide to one part of the ore, leaching the resulting product with cold water so as to remove chromium, silica, manganese and alumina values therefrom, and then leaching the residue with hot water to remove the major portion of the remaining soda therefrom.

16. The method of recovering metal values from chromium-bearing iron ores, which comprises roasting a mixture of the ore and an alkali metal compound of the group consisting of the hydroxide, carbonate and bicarbonate of sodium and potassium, leaching the resulting product to recover the chromium values therefrom, and then subjecting the residue to leaching with water containing carbon dioxide, whereby the alkali metal is removed or reduced to the smallest possible concentration.

17. The method of recovering metal values from chromium-bearing iron ores, which comprises roasting a mixture of the ore and sodium bicarbonate, leaching the resulting product to recover the chromium values therefrom, and then subjecting the residue to leaching with water containing carbon dioxide, whereby the soda is removed or reduced to the smallest possible concentration.

CHARLES V. FOERSTER.
ARTHUR T. CAPE.

REFERENCES CITED

The following references are of record in the file of this patent:

UNITED STATES PATENTS

| Number | Name | Date |
| --- | --- | --- |
| 1,760,788 | Specketer et al. | May 27, 1930 |
| 1,324,328 | Vis | Dec. 9, 1919 |
| 2,199,929 | Van Wirt | May 7, 1940 |
| 1,914,804 | Harshaw | June 20, 1933 |
| 725,501 | Spence et al. | Apr. 14, 1903 |

FOREIGN PATENTS

| Number | Country | Date |
| --- | --- | --- |
| 20,168 | Great Britain | 1894 |

Certificate of Correction

Patent No. 2,435,304. February 3, 1948.

CHARLES V. FOERSTER ET AL.

It is hereby certified that errors appear in the printed specification of the above numbered patent requiring correction as follows: Column 3, lines 50, 53, and 59, for the claim reference numeral "7" read *1*; column 4, lines 14 and 17, for the claim reference numeral "12" read *6*; column 3, line 10, beginning with "1. The method of" strike out all to and including the word and period "process." in line 38, same column, comprising claims 1 to 6, inclusive, and for the claims now numbered "7", "8", "9", "10", "11", "12", "13", "14", "15", "16", and "17" read *1, 2, 3, 4, 5, 6, 7, 8, 9, 10* and *11*, respectively; in the heading to the printed specification, line 10, for "17 Claims" read *11 Claims*; and that the said Letters Patent should be read with these corrections therein that the same may conform to the record of the case in the Patent Office.

Signed and sealed this 18th day of May, A. D. 1948.

[SEAL]

THOMAS F. MURPHY,
*Assistant Commissioner of Patents.*